US005953972A

United States Patent [19]

Nakagawa

[11] Patent Number: 5,953,972

[45] Date of Patent: *Sep. 21, 1999

[54] PUNCH PRESS DRIVE DEVICE

[75] Inventor: Atsushi Nakagawa, Aichi, Japan

[73] Assignee: Murata Kikai Kabushiki Kaisha, Kyoto, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/922,555

[22] Filed: Sep. 3, 1997

[30] Foreign Application Priority Data

Sep. 5, 1996 [JP] Japan .................................... 8-257586

[51] Int. Cl.[6] ............................ B26D 5/00; G05B 19/18; B30B 15/14

[52] U.S. Cl. ........................ 83/72; 83/74; 83/75; 83/76.7; 83/76.9

[58] Field of Search .................................... 83/72, 74, 75, 83/76.1, 76.7, 76.9, 76.6, 76.8, 360, 628, 630, 575

[56] References Cited

U.S. PATENT DOCUMENTS

| | | | |
|---|---|---|---|
| 5,279,197 | 1/1994 | Takeda et al. | 83/631 |
| 5,299,478 | 4/1994 | Schorn et al. | 83/13 |
| 5,588,344 | 12/1996 | Chun | 83/13 |
| 5,706,711 | 1/1998 | Ito | 83/74 |
| 5,709,125 | 1/1998 | Nakazawa et al. | 72/451 |

FOREIGN PATENT DOCUMENTS 8-1384 1/1996 Japan .

*Primary Examiner*—Rinaldi I. Rada
*Assistant Examiner*—T. Anthony Vaughn
*Attorney, Agent, or Firm*—Armstrong, Westerman, Hattori, McLeland & Naughton

[57] ABSTRACT

A device that increases the range of speeds at which the servo-motor may be used and stops insufficient output at times of slow speed, wherein an intermediate terminal is arranged in a primary winding as an output characteristic adjustment means for adjusting the torque with respect to the speed of the servo-motor and a switching control means is arranged for switching the connection of the power supply from a final terminal to an intermediate terminal when the punch speed exceeds a predetermined value.

2 Claims, 3 Drawing Sheets

PUNCH PRESS DRIVE DEVICE

BACKGROUND OF THE INVENTION

1. Field of the Invention

The present invention relates to a punch press drive device that drives a punch with a servomotor as a drive source.

2. Description of the Related Art

In order to decrease the noise and increase the processing quality on a punch press, the changing of the punch speed mid-stroke has been requested. A device where the punch speed can be changed has been realized on each type of hydraulic press but the equipment necessary for hydraulic systems are complicated and expensive. Due to this, instead of a hydraulic press type system, a system using a servomotor has been developed as a punch press drive device having a simple arrangement which is capable of changing the punch speed mid-stroke.

A three phase type induction motor as shown as a primary winding in FIG. 4A is used as this servomotor. This type of servomotor has output properties as shown by the curve p in FIG. 4B where the output (watts) is proportional to the speed (rotation count). When this is used for driving a punch press, it is used in a speed range from the motor speed $N_L$' where the minimum output $W_L$' necessary for accurate punch processing and is possible and is obtained to the maximum motor speed Nb' where the linearity of the output curve p is maintained.

However, in punch processing, high speed punch actions are required for a nibbling process, or the like where shearing of the work is performed by continuous punching and an increase in speed of the punch processing is difficult in the aforementioned speed range ($N_L$'–Nb'). If the servomotor is such that the proportion of output change to the speed change is small (the slope of the curve p of FIG. 4B is less steep), high speed processing becomes possible but the output at low speed is insufficient.

SUMMARY OF THE INVENTION

In order to solve the aforementioned problems, it is an object of the present invention to pounds a punch press drive device capable of increasing the range of speeds at which the servomotor may be used and remove the output insufficiency at low speeds.

Another object of the present invention is a punch press drive device whereby the output characteristics of the servomotor may be changed by a simple arrangement.

A further object of the present invention is a punch press drive device which achieves a reduction in energy consumption and reduces wasteful output.

The arrangement of the present invention will be described with reference to FIG. 1A corresponding to one embodiment of the invention. This punch press drive device FIG. 1A, drives a punch 5 by a servomotor 2 and is arranged with an output characteristic adjustment means 11B shown in FIG. 1B, for adjusting the torque with respect to the speed of the servomotor 2 and a control means 16 for controlling the output characteristic adjustment means 11B. The control means lowers 16 the characteristics of the torque when the speed of the punch 5 exceeds a predetermined speed.

In general, a servomotor 2 has characteristics whereby the torque is uniform and the output proportional to the motor speed. The relationship between the motor output and torque is: Output=Coefficient×Torque×Speed. Due to such relationship, output insufficiencies are prevented at low speeds by the aforementioned arrangement due to the operation as output characteristics, whereby the torque increases with respect to the speed. Furthermore, when the speed increases, a speed where the linearity of the output change with respect to the speed is obtained, up to the high speed range and high speed operation is then possible by changing the output characteristics such that the torque is lowered. At times of high speed, a large output may be obtained even if the torque is small. Thus there is an impediment to punch processing even if the torque is lowered.

In the aforementioned arrangement, the output characteristic adjustment means 11B may comprise at least two terminals arranged on the primary winding 10 of the servomotor 2 and the switching control means 16 may be able to switch the terminals 11A, 11B that connect the power supply 14 to the primary winding 10. Due to this, the output characteristics may be easily changed by a simple arrangement.

Furthermore, when the entire length of the primary winding 10 is used, the switching control means 16 may be able to perform switching when the motor speed at which the minimum necessary output is obtained is reached even if only the winding part 10*b* as far as the terminals 11B are used. When the entire length of the primary winding 10 is used, there is no interference to operations even if the motor characteristics are switched within the maximum range where linearity of the curve of the output with respect to the speed is obtained. However, by performing switching when the motor speed at which the minimum necessary output is obtained is reached even if only the winding part 10*b* up to the terminal 11B is used as with this arrangement, the period of operation under low torque increases and the power usage is economised.

DETAILED DESCRIPTION OF THE PREFERRED EMBODIMENTS

Figure 1A:
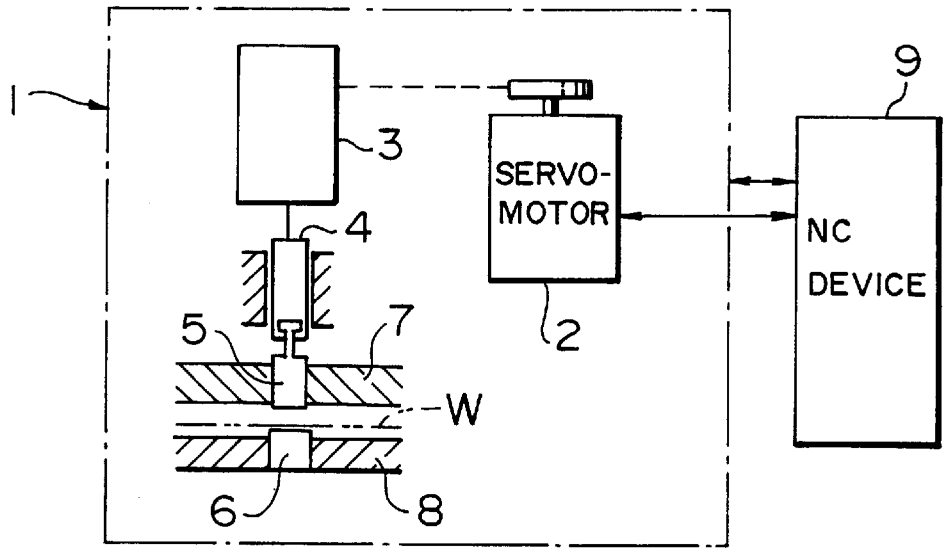
FIG. 1A is a schematic diagram of the punch press using the punch press drive device in accordance with a first embodiment of the present invention.

A first embodiment of the present invention will be described based on FIGS. 1A through 3B.

A punch press 1 converts the rotational output of a servomotor 2 to a vertical movement of a ram 4 via a movement conversion system 3 and performs punch processing of work W between a punch 5 linked to the ram 4 and a die 6. The punch 5 and die 6 are arranged on upper and lower turrets 7 and 8, respectively. The movement conversion system 3 comprises a crank system that converts the rotation of the servomotor 2 to a reciprocal linear movement in the horizontal plane, and a toggle system (neither shown in the drawings) that converts that converted reciprocal linear movement into a vertical reciprocal linear movement of the ram 4.

The servomotor 2 is controlled by a computer type NC device 9 that controls the entire punch press 1. The NC device 9 is provided with a programmable controller.

Figure 1B:
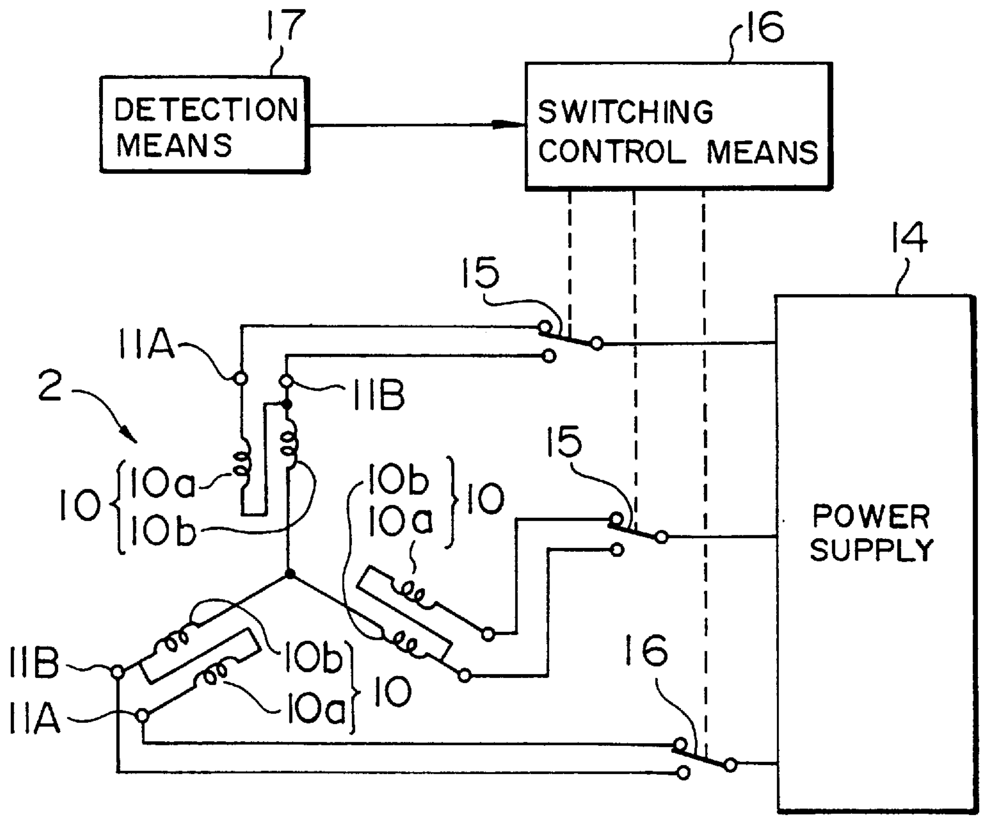
FIG. 1B is an explanatory drawing of the arrangement of such punch press drive device.

The servomotor 2 comprises a three phase induction motor and the primary winding being the stator winding is a Y-shaped connection as shown in FIG. 1B. The winding 10 of each phase of the primary winding are divided into a plurality (in this embodiment, 2) of winding parts 10*a*, 10*b* connected in series by the arrangement of intermediate terminals 11B. The output characteristic adjustment means for adjusting the torque with respect to the speed of the servomotor 2 is comprised of these intermediate terminals 11B. Connection of the final terminal 11A and intermediate terminal 11B of each phase to the power source 14 is possible by switching a switch 15 of each.

These switches 15 are switched by a switching control means 16. The switching control means 16 is comprised of electronic circuitry, switches the connection from the terminal 11A to terminal 11B by determining from the detected value of the detection means 17 of the motor speed that the speed of the punch 5 has exceeded the predetermined speed, and performs operations that re-switch to the original connection state when the speed of the punch drops below the predetermined speed. The aforementioned predetermined speeds at which contact switching of the speed increase times and speed processing times is performed may be set at different values to each other. The predetermined speed at speed increase times may be the speed described hereafter in detail. In short, even with use of the primary winding 10 up to the intermediate terminal 11B, the motor speed is such that the minimum necessary output $W_L$ (FIG. 2A) is obtained.

Hereafter, the actions of the aforementioned arrangement will be described.

Figure 2A:
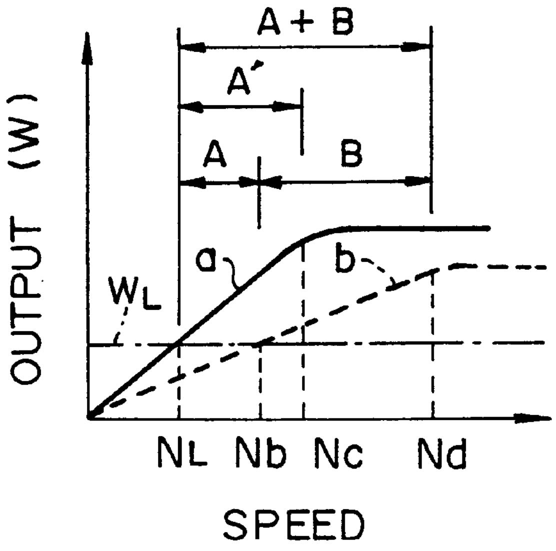
FIG. 2A is a graph showing the features of output against the speed of the servomotor.
Figure 3A:
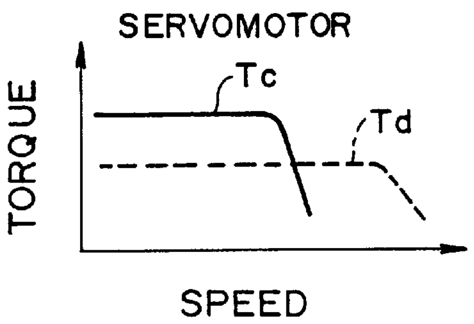
FIG. 3A is an explanatory drawing showing the torque with respect to the speed of the servomotor.

The output characteristics of the output (watts) with respect to the motor speed (rotation count) when all the wires 10*a*,10*b* of the primary winding 10 of the servomotor 2 are used is as shown by the curve a in FIG. 2A and maintains linearity (proportional relationship) until the speed Nc. The output characteristics of when only the winding part 10*b* is used by connection to the intermediate terminal 11B forms a slope gentler than the curve a as shown by the curve b in the figure and maintains linearity from the aforementioned speed Nc until the high speed Nd. The torque of the servomotor 2 is uniform with respect to the speed as shown in FIG. 3A when all windings are in the utilized state and in comparison with the torque Tc of when all the winding parts 10*a*,10*b* are used, the torque Td is lower when only one part of the winding part 10*b* is used. In this way, the characteristics of the output with respect to the speed of the servomotor 2 may be changed by switching of the connected terminals 11A,11B.

When the driving of the servomotor 2 starts, the switch 15 is connected to the terminal 11A side and all the wires 10*a*,10*b* of the primary winding 10 are used. At this time, correct operation is possible from the speed $N_L$ where the output shown on the curve a has reached the minimum output $W_L$ necessary for punch processing, to the speed Nc of the maximum output where linearity is maintained but the switching of the switch 15 is performed at speed Nb before speed Nc is reached.

Speed Nb is the speed when the motor output shown on the curve b has reached the minimum necessary output $W_L$ when only the winding part 10*b* of up to the intermediate terminal 11B is used. Thus linearity is maintained up to the high speed Nd more than the maximum speed Nc Where linearity is maintained when the entire winding is used by changing the motor characteristics by reducing the used part of the winding 10. Due to this, the range of speeds of the servomotor 2 which may be used increase to $N_L$~Nd (A+B). In particular, the high speed range increases and accordingly, high speed punch processing is possible for nibbling processing or the like.

Figure 2B:
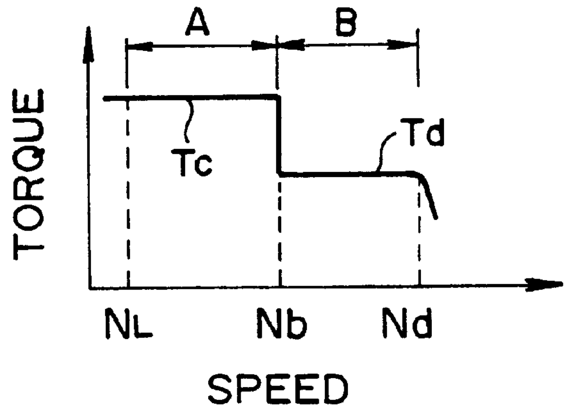
FIG. 2B is an explanatory drawing showing the change in torque when the characteristics of the servomotor are switched.

When only the winding part 10*b* is used, the torque is reduced as shown by the curve Td in FIG. 3A and FIG. 2B but the relationship between the motor output and the torque is (Output)=(Coefficient)×(Torque)×(Speed) and when only the winding part 10*b* is used, it is at high speed thus there is no output insufficiency.

Figure 3B:
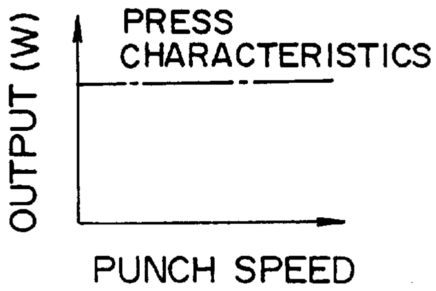
FIG. 3B is a graph showing the features of output against the punch speed of the punch press.
Figure 4A:
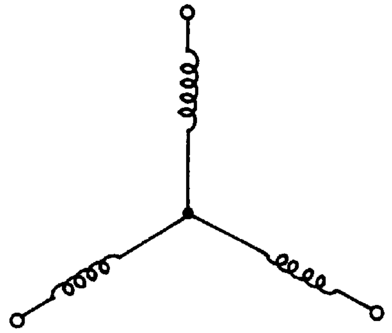
FIG. 4A is a circuit diagram showing a primary winding of a conventional servomotor.
Figure 4B:
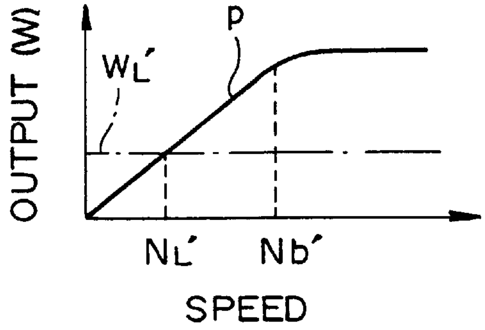
FIG. 4B is a graph showing the features of output against that speed.

The removal force of the punch press 1 shows uniform output characteristics with respect to the punch speed as shown in FIG. 3B and by changing the characteristics of the servomotor as previously described, the characteristics of the servomotor 2 become similar to the press characteristics and provide effective use of the servomotor 2.

The switching of the output characteristics is performed at the speed Nb where the minimum necessary output $W_L$ is obtained with only the winding part 10*b* and this speed Nb is slower than the maximum speed Nc of when the entire winding is used but due to this early switching, the period when low torque is used increases and there is energy conservation by reducing wasteful power consumption.

It should be noted that in the aforementioned embodiment, the intermediate terminal 11B is at one place in the center and the winding 10 has been split in half but the location where the intermediate terminal 11B is arranged may be at any desired place in the winding 10 in order to obtain the desired output characteristics, an intermediate terminal 11B may be arranged in a plurality of places and switching between more than three output characteristics is possible.

Furthermore, the arrangement whereby the output characteristic of the servomotor is changed is not limited to an arrangement arranged with intermediate terminals 11B and may comprise a variety of arrangements. Furthermore, the present invention is not limited to the case where the servomotor 2 is a three phase induction motor and a two phase induction motor, synchronized motor or direct current motor may be used.

As the punch press drive device of the present invention is a punch press drive device that drives a punch by a servomotor, is arranged with an output characteristic adjustment means for adjusting the torque with respect to the speed of the servomotor and also a switching control means for controlling that output characteristic adjustment means so as to reduce the torque characteristics when the speed of the punch exceeds a predetermined speed, the range of speeds in which the servomotor may be used increases and there is no insufficient output at low speed times.

When the output characteristic adjustment means comprises at least two terminals arranged in the primary winding of the servomotor and the switching control means switches the terminals that connect the power supply to the primary winding, the output characteristics of the servomotor may be changed by a simple arrangement.

Furthermore, when the entire length of the primary winding is used, when the switching control means performs switching when the motor speed is reached such that the minimum necessary output is obtained even if only a part of the winding up to the intermediate terminal is used, operation with wastefully large torque may be avoided and the power consumption may be economised.

I claim:

1. A punch press drive device that drives a punch comprising:

a servomotor;

an output torque characteristic adjustment means for changing a torque of the servomotor to a lower torque characteristic when a speed of the servomotor exceeds a predetermined speed; and a control means for controlling the output torque characteristic adjustment means, wherein the output torque characteristic adjustment means comprises at least two terminals arranged in the primary winding of the servomotor and the control means changes the length of winding utilized by the primary winding by selecting the appropriate terminals.

2. A punch press drive device as recited in claim 1, further comprising:

detection means connected to the control means for detecting the speed of the punch press, and when the detection means detects that the speed of the punch exceeds a predetermined speed, the control means controls the output torque characteristic adjustment means so as to change the torque of the servomotor to the lower torque characteristic, wherein the output torque characteristic adjustment means comprises at least two terminals arranged in the primary winding of the servomotor and the control means shortens the length of winding utilized by the primary winding by selecting the appropriate terminals.

* * * * *